United States Patent
Thomas et al.

(10) Patent No.: US 6,616,177 B2
(45) Date of Patent: Sep. 9, 2003

(54) DUAL DEPTH AIRBAG

(75) Inventors: Scott David Thomas, Novi, MI (US); David Charles Viano, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/879,868

(22) Filed: Jun. 11, 2001

(65) Prior Publication Data

US 2002/0185845 A1 Dec. 12, 2002

(51) Int. Cl.$^7$ .............................................. B60R 21/24
(52) U.S. Cl. .................... 280/729; 280/736; 280/738
(58) Field of Search ............................. 280/729, 730.1, 280/734, 736, 738

(56) References Cited

U.S. PATENT DOCUMENTS

| | | | | |
|---|---|---|---|---|
| 3,733,091 A | * | 5/1973 | Fleck et al. ................... 280/729 |
| 3,747,952 A | * | 7/1973 | Graebe ......................... 137/67 |
| 3,753,576 A | * | 8/1973 | Gorman ..................... 280/730.1 |
| 3,792,873 A | * | 2/1974 | Buchner et al. ............. 139/389 |
| 3,909,327 A | * | 9/1975 | Pechini ..................... 156/89.14 |
| 3,910,595 A | * | 10/1975 | Katter et al. ................ 280/732 |
| 4,360,223 A | * | 11/1982 | Kirchoff .................... 280/729 |
| 5,022,675 A | * | 6/1991 | Zelenak et al. ............ 280/743.1 |
| 5,246,250 A | * | 9/1993 | Wolanin et al. ............. 251/294 |
| 5,366,241 A | * | 11/1994 | Kithil ..................... 280/730.1 |
| 5,458,366 A | * | 10/1995 | Hock et al. .................. 280/729 |
| 5,520,413 A | * | 5/1996 | Mossi et al. ................. 280/729 |
| 5,599,041 A | * | 2/1997 | Turnbull et al. ............. 280/729 |
| 5,695,214 A | | 12/1997 | Faigle et al. ................ 280/735 |
| 5,867,842 A | * | 2/1999 | Pinsley et al. ................ 2/462 |
| 5,887,894 A | | 3/1999 | Castagner et al. ........ 280/743.2 |
| 5,927,748 A | | 7/1999 | O'Driscoll ................... 280/729 |
| 5,951,043 A | * | 9/1999 | Mooney et al. ............. 280/736 |
| 6,209,908 B1 | * | 4/2001 | Zumpano .................... 280/729 |
| 6,276,716 B1 | * | 8/2001 | Kato .......................... 280/729 |

OTHER PUBLICATIONS

U.S Application Series No. 09/817,784 Filed on Mar. 26, 2001.
U.S Application Series No. 09/817,767 Filed on Mar. 26, 2001.
U.S Application Series No. 09/672,409 Filed on Sep. 28, 2000.

* cited by examiner

Primary Examiner—Paul N. Dickson
Assistant Examiner—Toan C To

(57) ABSTRACT

An air restraint system has an airbag which is deployable between an instrument panel and an occupant seat within an automotive vehicle. The airbag includes first and second air chambers which are separated to restrict flow therebetween by a single panel member. The first and second chambers of the airbag are selectively pressurizable with a gaseous fluid which is distributed from an inflator through a plurality of passages, and the flow therein is controlled by a valve member. The valve member is operable to distribute the pressurized fluid to one chamber, both of the chambers of the airbag or to the atmosphere.

2 Claims, 6 Drawing Sheets

DUAL DEPTH AIRBAG

TECHNICAL FIELD

This invention relates to airbags or air restraint systems.

BACKGROUND OF THE INVENTION

Airbags or air restraint systems, as they are often termed, are a device utilized in passenger vehicles to protect passengers from unintended impacts occurring to the vehicle. The airbags in use are generally a single bag deployed from either the steering mechanism or the instrument panel, and it has been proposed to deploy airbags from the overhead structure, the doors, the seats, or from the side structure adjacent the window.

Airbags are becoming more complex, and currently being considered are dual stage inflators that adjust the inflation pressure of the airbags. Dual stage inflators are especially useful in situations where a small occupant is sitting forward in the seat or when a low speed impact occurs.

The first stage of the inflator is generally sufficient to restrain the occupant during these particular conditions. However, in more severe impacts or with a heavier passenger and with an unbelted occupant in the seating position, the second stage may be activated, thereby increasing the pressure in the airbag to balance the higher energy need for occupant restraint. While these dual level inflator systems are effective, they do involve a complex sensing and deployment algorithm that is specific for each vehicle impact pulse, thus complicating the design and validation process.

It has also been proposed in U.S. Pat. No. 5,927,748, issued Jul. 27, 1999, that a multi-stage inflatable bag might be utilized in air restraint systems. The air restraint system disclosed in the above-mentioned patent has an inner bag which is rapidly inflated to provide an initial cushion and an outer bag which is inflated by gas escaping from the inner bag to provide a secondary cushion for the occupant. The secondary cushion in effect provides a softer spring rate between the occupant and the interior of the car during impact occurrences.

SUMMARY OF THE INVENTION

It is an object of the present invention to provide an improved air restraint system having at least two independently deployable airbag cushion volumes incorporated therein.

In one aspect of the present invention, the air restraint system includes a dual depth airbag which has two air chambers. In another aspect of the present invention, the two airbag chambers are individually pressurized during a response to an impact on the vehicle. In yet another aspect of the present invention, one of the airbag chambers deploys nearest or near to the occupant and the other airbag chamber deploys between the first airbag chamber and the interior of the vehicle.

In still another aspect of the present invention, the two airbag chambers share a common bag panel. In yet still another aspect of the present invention, the air bag chambers may have vent openings formed therein. In yet still another aspect of the present invention, the individual airbag chambers have separate opening or neck connections to the vehicle "A" pillar.

In a further aspect of the present invention, a control valve is employed within the inflation package to control the selective distribution of inflation gas to one or both of the airbag chambers and to the outside atmosphere. In yet a further aspect of the present invention, the airbag chambers are deployable individually or in concert when required.

DESCRIPTION OF AN EXEMPLARY EMBODIMENT

Figure 1:
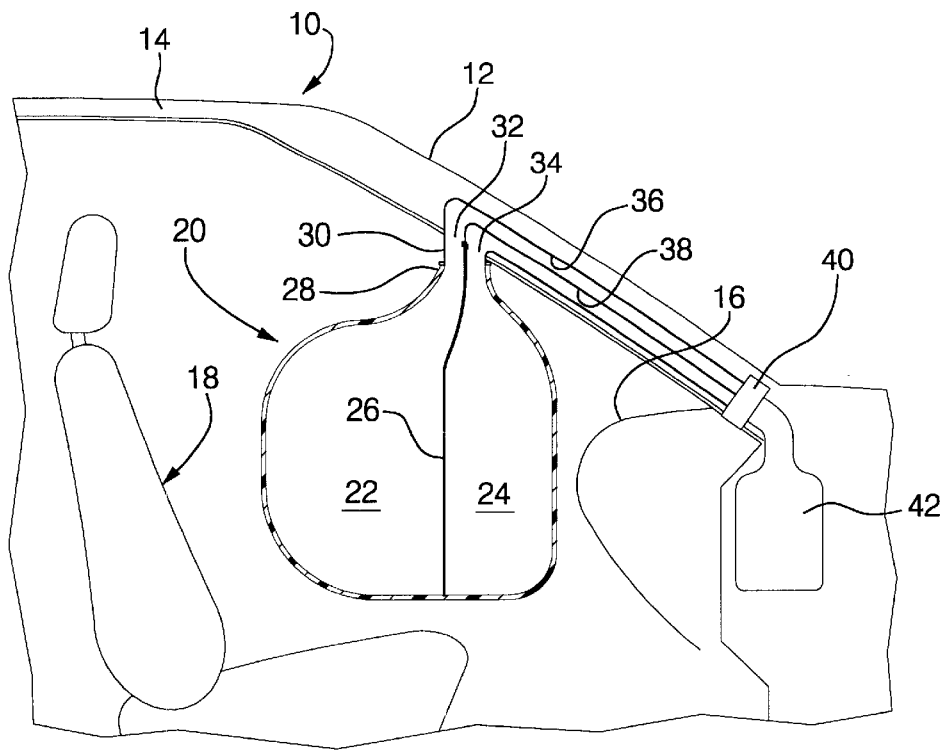
FIG. 1 is a diagrammatic representation of an air restraint system incorporating the present invention with both airbags deployed.

Referring to the drawings, wherein like characters represent the same or corresponding parts throughout several views, there is seen a portion 10 of an automotive or motor vehicle. The portion 10 includes an "A" pillar 12, a roof panel 14, an instrument panel 16 and an occupant seat 18.

An air restraint system or airbag 20 is stored in the "A" pillar 12 and roof panel 14. The airbag 20 when deployed, as shown in FIG. 1, extends downward between the passenger seat 18 and the instrument panel 16. The airbag 20 includes a first airbag chamber 22 and a second airbag chamber 24, both of which are shown expanded in FIG. 1. The chambers 22 and 24 share a common panel 26.

The airbag 20 has a neck portion 28 secured to a neck attachment 30 formed on the "A" pillar 12. The neck portion 28 and panel 14 cooperate with the neck portion 28 to form two inlet passages 32 and 34 which are in communication with respective feed passages 36 and 38. The two passages connect with a control box 40 which directs gas flow from an inflator 42 to the passages 36 and 38.

Figure 2:
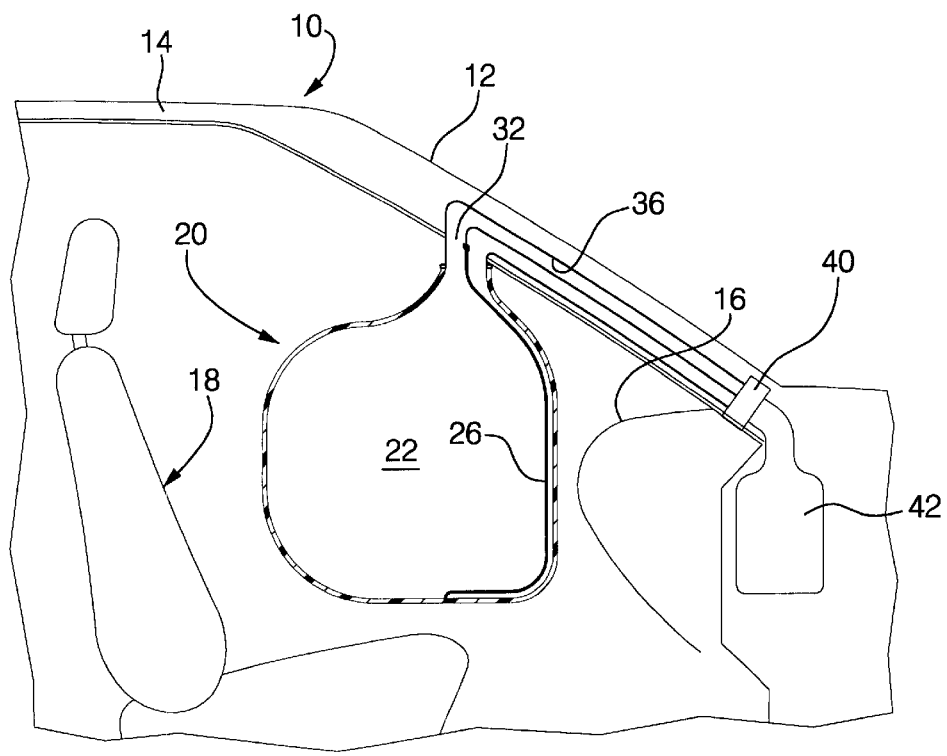
FIG. 2 is a diagrammatic representation similar to FIG. 1 with one of the bags deployed.

As shown in FIG. 2, by selectively distributing the inflation gas through passage 36 to the air chamber 22, only that portion of the airbag 20 will be deployed, thereby filling less of the space between the passenger seat 18 and the instrument panel 16. This is useful when the passenger in the seat 18 is close to the instrument panel 16 or during a low speed impact, thereby reducing the deployment area available for the airbag 20.

Figure 3:
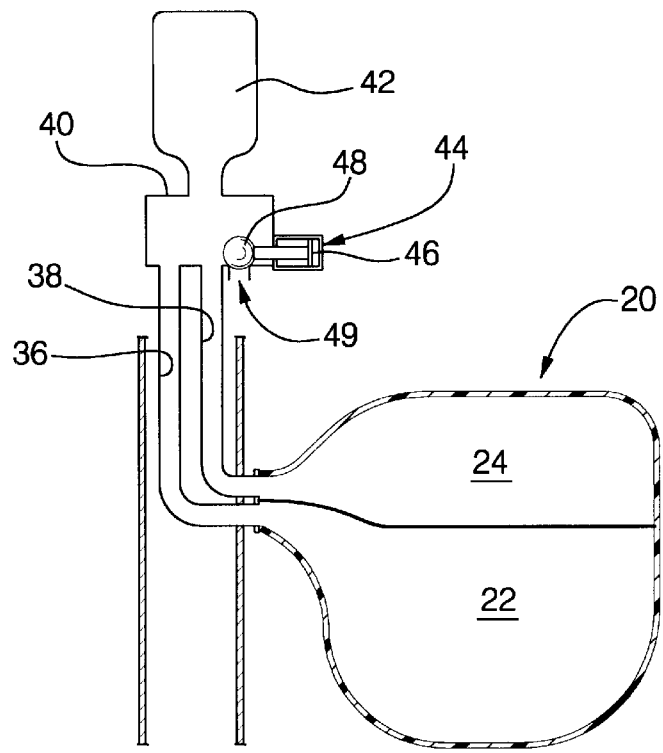
FIG. 3 is a diagrammatic representation of an air restraint system incorporating the present invention and employing a valve member to control gas flow.

As best seen in FIG. 3, the control box 40 includes a control valve 44 which includes an actuating piston 46 and a ball valve 48. Those skilled in the art will recognize that other valve structures are also possible within the scope of the present invention. The actuating piston 46 is effective to move the ball valve to close either the passage 38 or the passage 36. In FIG. 3, the ball valve 48 is retracted such that both passages 36 and 38 are open and the passage 49 is closed to atmosphere, whereby gaseous inflator fluid from the inflator 42 will travel through both passages 36 and 38, thereby filling both air chambers 22 and 24.

Figure 4:
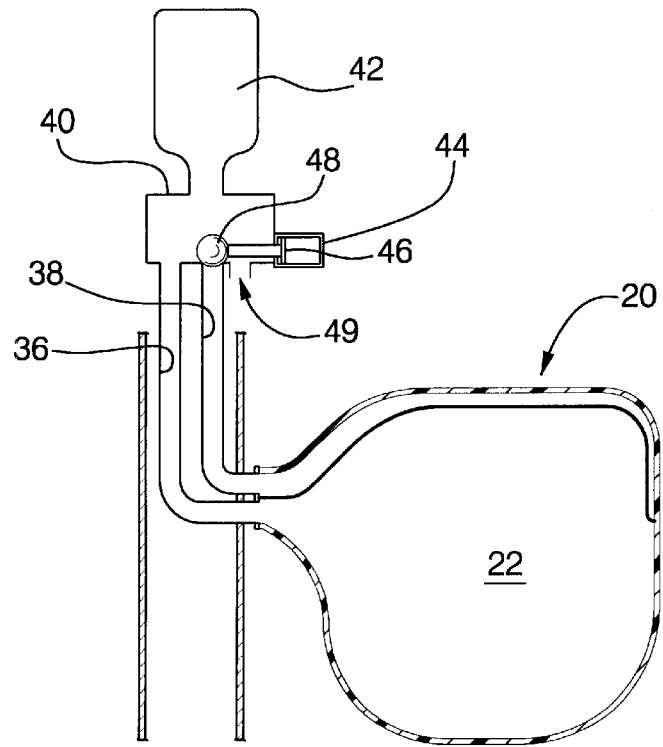
FIG. 4 is a diagrammatic representation similar to FIG. 3 showing an airbag system incorporating the present invention with the control valve actuated.

As seen in FIG. 4, the valve 44 has been energized such that the piston 46 moves the ball valve 48 to cover or thereby close the passage 38 such that the gaseous inflator fluid flows through only the passage 36 to fill the chamber 22. Excess gaseous inflator fluid can be selectively exhausted through an opening 49 of the valve 44 when the ball valve 48 is moved to cover the passage 38. In the alternative, a conventional valve mechanism can be located in one or both passages 36 and 38 to selectively exhaust or close each of the passages. It is also possible to energize the piston 46 and ball valve 48 such that the passage 36 is closed while the passage 38 is open to permit filling of only the chamber 24.

Figure 5:
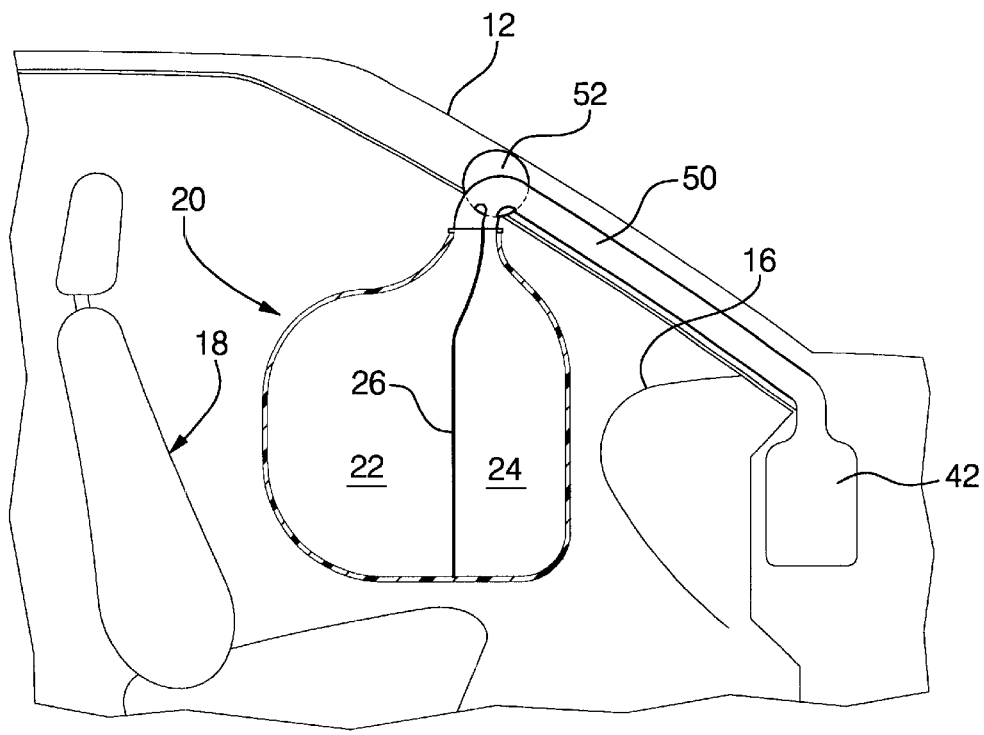
FIG. 5 is a diagrammatic representation of an air restraint system incorporating the present invention and utilizing a single throat or inflator pipe to inflate both airbags and a valve to control the flow.

As seen in FIG. 5, the single passage 50 is employed between the inflator 42 and the airbag 20. A control valve 52 is utilized in the "A" pillar 12 to direct the inflator gas from the inflator 42 and the passage 50 through the valve 52 to the chambers 22 and 24 of the airbag 20.

Figure 6:
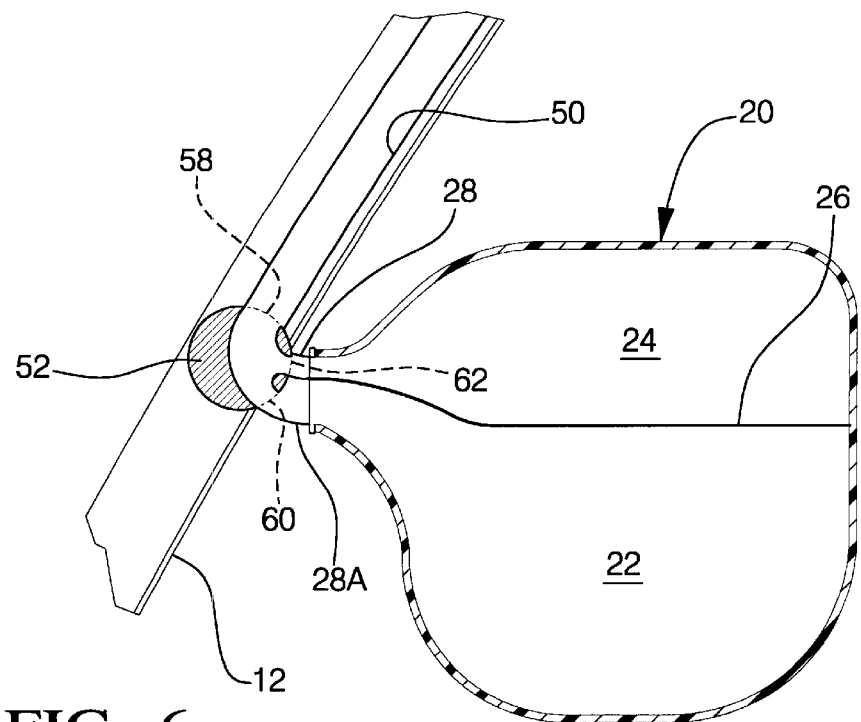
FIG. 6 is a diagrammatic representation of the air restraint system shown in FIG. 5 with the air valve actuated to inflate both airbags.
Figure 8:
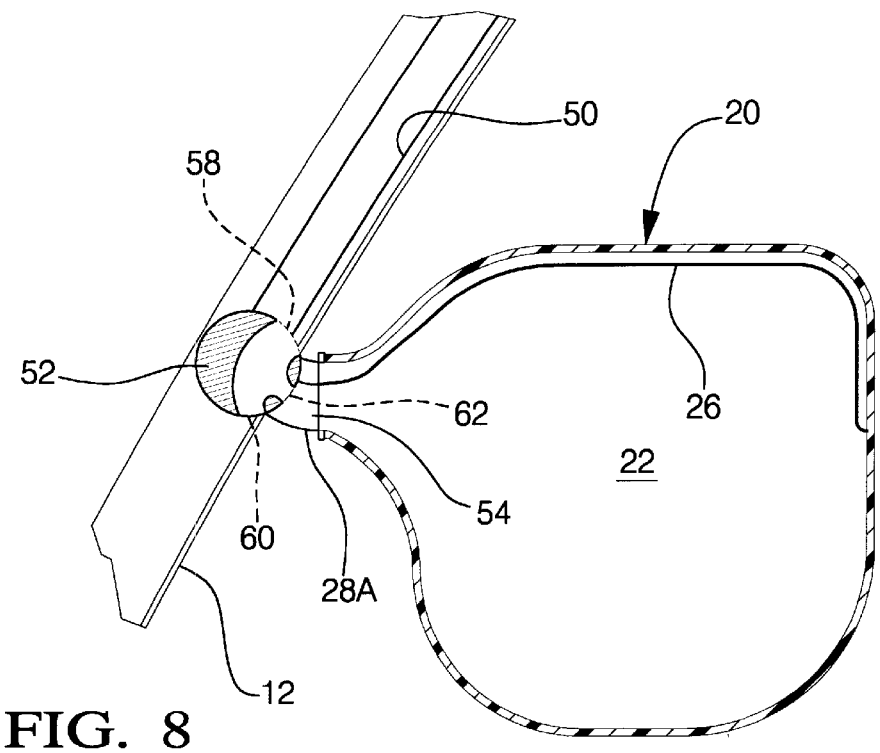
FIG. 8 is a diagrammatic representation of a portion of the air restraint system shown in FIG. 5 with the valve actuated to deploy one airbag.
Figure 9:
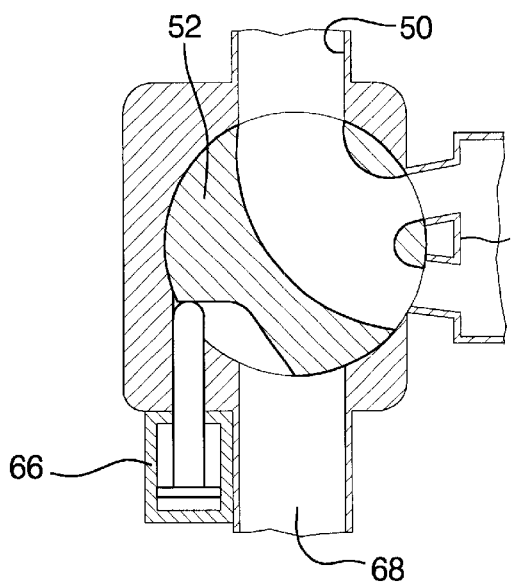
FIG. 9 is a diagrammatic representation of the air valve employed in FIGS. 5 through 8.

As best seen in FIGS. 6, 8 and 9, valve 52 is a rotary member disposed within the passage 50 and the "A" pillar 12. The airbag 20 has two inlet portions or passages 54 and 56 formed integrally with the neck portions 28, 28A. The common panel 26 is also sealed in the neck portions 28, 28A. The valve 52 has an inlet opening 58 and two discharge openings 60 and 62. As the valve 52 is rotated, the discharge openings come into registration with one or both of the inlet openings or passages 54 and 56.

Figure 7:
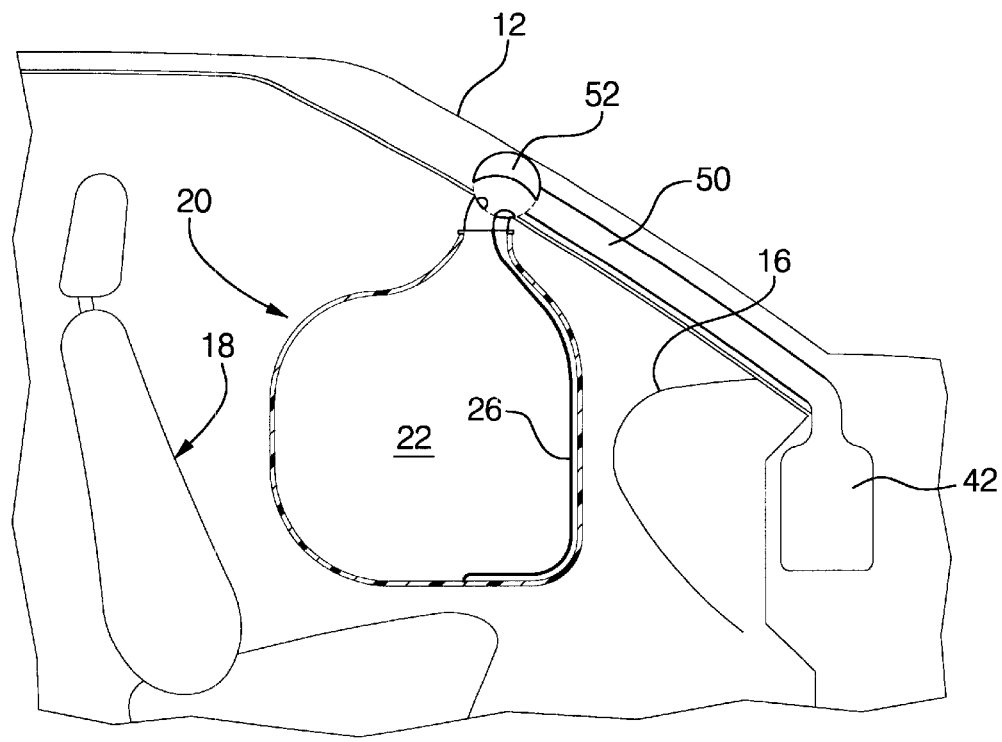
FIG. 7 is a diagrammatic representation of the air restraint system shown in FIG. 5 with one of the airbags actuated or inflated.

As seen in FIG. 6, the valve 52 has been rotated sufficiently to register the opening 60 with passage 54 and the opening 62 with the passage 56, thereby inflating both chambers 22 and 24. As seen in FIG. 8, the valve 52 has been rotated sufficiently to open the opening 62 to the inlet opening 54 such that only the chamber 22 of the airbag 20 is filled. This is also the deployment depicted in FIG. 7 in which the airbag is shown deployed between the seat 18 and the instrument panel 16. Excess gaseous inflator fluid can be exhausted through the opening 60 and a passage 68 that is located outside of the air bag module as seen in FIG. 8.

Figure 10:
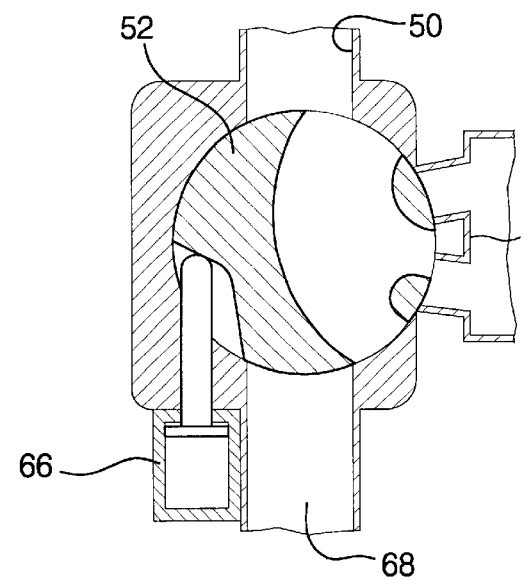
FIG. 10 is a diagrammatic representation of a control for the air valve shown in FIG. 9.

FIG. 9 depicts the valve 52 as being rotated sufficiently to feed both chambers 22 and 24 of the airbag 20 similar to the depiction of FIG. 6. FIG. 10 shows the control valve 52 and a control or thrust piston 66. The thrust piston 66 is responsive to a conventional electronic airbag sensing system such that the rotation of the valve 52 is controlled to permit inflator gas in the passage 50 to fill either one or both of the airbag chambers 22 and 24. The piston 66 can, of course, be operated with any other of the well-known actuator mechanisms that are available, such as pyrotechnic, mechanical, hydraulic or electrical systems.

It should be appreciated that while the control valve 52 is shown as a rotary member, a linear or translatable valve is also possible to control the flow of inflation gases on the passage 50 to the inlet passages 54 and 56. Those skilled in the art of control design and particularly valve control design will appreciate the variations that are possible in the control valve mechanism for the valve 52 and the motion of the valve 52 to control the gas flow from the passage 50 to the airbag chambers 22 and 24 and control the exhaust flow through passages 49 and 68. While the flow passages are shown installed in the "A" pillar, other locations of the multi-chamber airbag incorporating the present invention are possible. The multi-chamber airbag can be installed in other locations such as the steering wheel, the instrument panel, the vehicle doors or the vehicle seats, to name a few.

Figure 11:
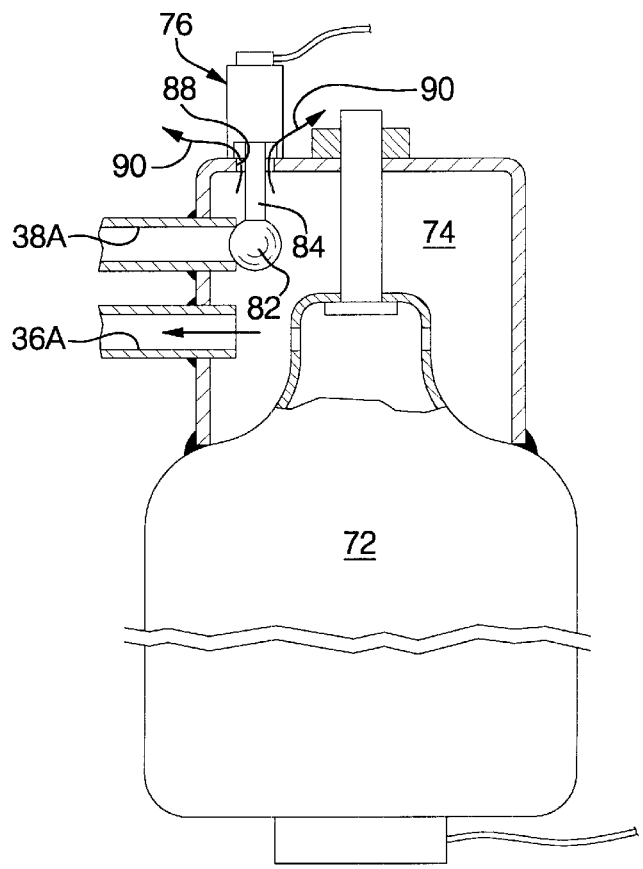
FIG. 11 is a diagrammatic representation of an inflator and valve assembly for the present invention with the valve assembly in the unactuated position.
Figure 11A:
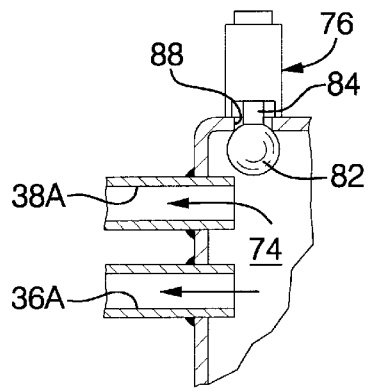
FIG. 11A is a view of a portion of FIG. 11 depicting the valve assembly in an actuated position.

An inflator and valve assembly 70, shown in FIG. 11, includes an inflator source 72, a outflow chamber 74, a control valve 76 and passages 36A and 38A. The passages 36A and 38A are connected to the air bag chambers 22 and 24, respectively. The inflator source 72 responds to the conventional airbag sensing system to initiate a large volume flow of gaseous fluid into the outflow chamber 74 for controlled distribution by the control valve 76 to the airbag chambers 22 and 24 and to atmosphere.

The control valve 76 has an electric actuator 78 and a valve element 80. The valve element 80 includes a ball 82 and a stem 84. The stem 84 extends from the actuator 78 through an opening 88 to the ball 82. In the unactuated position shown, the ball 82 is positioned to close the passage 38A and thereby prevent the gas flow from inflating the chamber 24 while permitting gas flow to the passage 36A and the chamber 22. If an impact occurs, the inflator source 72 is responsive to the electronic airbag sensing system to supply a rapidly expanding gas flow to the chamber 74. If the impact is sensed to have a low energy, the airbag sensing system will not actuate the control valve 76 such that no gas flow will be directed to the passage 38A which is closed by the ball 82. However, the inflator source 72 will produce more gas volume than the airbag chamber 22 needs for complete inflation. The excess gas in the chamber 74 is exhausted to atmosphere by flowing through the opening 88 as indicated by the arrows 90. If the impact is sensed as a high energy impact, the airbag sensing system will actuate the control valve 76 such that the ball 82 and stem 84 are moved to close the opening 88, thereby preventing the gas in the chamber 74 from exhausting to atmosphere. The gas will be directed to both passages 36A and 38A when the control valve 76 is actuated to enforce the inflation of both chambers 22 and 24. Other sensing inputs can also be employed. For example, seat position, seat belt usage, or occupant position or weight can be sensed, to name a few. Those skilled in the art will be aware of the many various sensing systems that can be employed.

Figure 12:
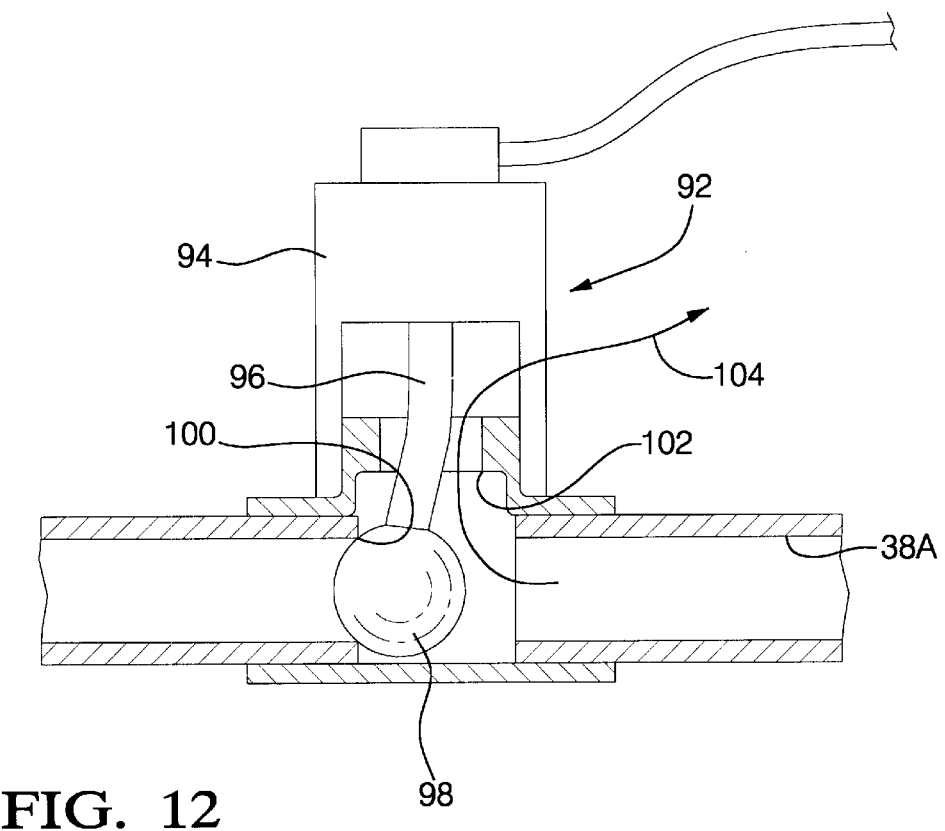
FIG. 12 is a diagrammatic representation of an unactuated exhaust control valve assembly disposed in a fill passage of a multi-chamber airbag.
Figure 13:
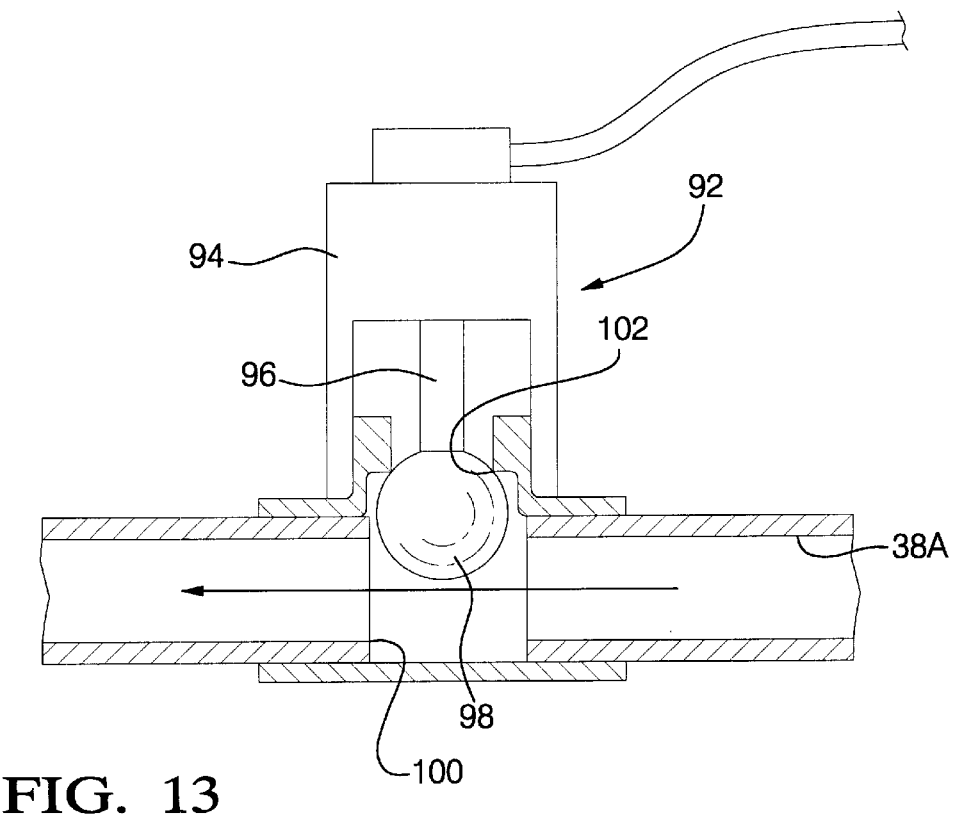
FIG. 13 is a diagrammatic representation of the exhaust control valve shown in FIG. 12 in the actuated position.

As an alternative to exhausting the excess gas flow of the inflator source, an exhaust control valve 92 is deployed in at least one of the passages (passage 38A) as shown in FIGS. 12 and 13. The exhaust control valve 92 includes an electronic actuator 94, a stem 96 and a ball 98. In the unactuated position shown in FIG. 12, the ball 98 extends into the passage 38A and rests against a valve seat 100 formed therein to prevent gas flow through the passage 38A to the chamber 24. The gaseous flow from the inflator source is directed through an opening 102 to atmosphere as indicated by the arrow 104. This is the condition of the exhaust control valve 92 when a low energy impact is sensed by the electronic airbag sensing system. If a high energy impact is sensed by the airbag sensing system, the exhaust control valve 92 is actuated, as seen in FIG. 13, and the ball 98 is retracted from the passage 38A and brought into sealing engagement with the opening 102. When the exhaust control valve 92 is actuated, the gas flow is directed to the chamber 24 to enforce inflation thereof.

With the installation of either the inflator and valve assembly 70 or the exhaust control valve 92, the excess gas flow is prevented from reaching the airbag chambers that are not to be inflated and also preventing the chamber that is inflated from being overpressurized. Both of these functions are important in the controlling of airbag inflation. The exhaust control valve 92 and the inflator and control valve 92 or similar control mechanisms are also useful in single chamber systems where it is desirable to control the pressure level in the airbag chamber.

What is claimed is:

1. An air bag restraint system comprising:
    an inflator source for supplying a flow of pressurized gaseous fluid;
    passage means operatively connected with said inflator source for distributing said flow of pressurized gaseous fluid;
    an air restraint having first and second expansible air chambers, each of said first and second expansible air chambers being separately operatively connected with said passage means;
    a panel member integral with and separating said first and second expansible air chambers, said panel member restricting gaseous flow between said chambers;
    a control mechanism for selectively distributing said flow of pressurized gaseous fluid to one or both of said first and second expansible air chambers;
    said passage means having first and second passages connected between said control mechanism and said first and second air chambers respectively; and
    said control mechanism comprising a valve assembly having means for controlling the distribution of said flow of pressurized gaseous fluid to said first and second passages individually or in concert.

2. An air bag restraint system comprising:
    an inflator source for supplying a flow of pressurized gaseous fluid;
    passage means operatively connected with said inflator source for distributing said flow of pressurized gaseous fluid;
    an air restraint having first and second expansible air chambers, each of said first and second expansible air chambers being separately operatively connected with said passage means; and
    a control mechanism including a valve member for selectively distributing said flow of pressurized gaseous fluid simultaneously to both of said first and second expansible air chambers or simultaneously to distribute pressurized gaseous fluid to one of said chambers and exhaust a portion of said pressurized gaseous fluid to atmosphere.

* * * * *